(12) United States Patent
Yang et al.

(10) Patent No.: US 8,833,637 B2
(45) Date of Patent: Sep. 16, 2014

(54) LIVE WELDING METHOD AND ARRANGEMENT FOR ALUMINUM ELECTROLYTIC CELL UNDER SERIES FULL CURRENT

(75) Inventors: Tao Yang, Guiyang (CN); Bin Cao, Guiyang (CN)

(73) Assignee: China Aluminum International Engineering Corporation Limited (CN)

( * ) Notice: Subject to any disclaimer, the term of this patent is extended or adjusted under 35 U.S.C. 154(b) by 0 days.

(21) Appl. No.: 13/512,217

(22) PCT Filed: Nov. 17, 2010

(86) PCT No.: PCT/CN2010/001841
§ 371 (c)(1),
(2), (4) Date: Aug. 21, 2012

(87) PCT Pub. No.: WO2011/060614
PCT Pub. Date: May 26, 2011

(65) Prior Publication Data
US 2012/0305630 A1 Dec. 6, 2012

(30) Foreign Application Priority Data
Nov. 17, 2009 (CN) .......................... 2009 1 0309868

(51) Int. Cl.
*B23K 31/02* (2006.01)
*B23K 31/00* (2006.01)
*C25D 9/04* (2006.01)
*C25D 21/12* (2006.01)
*C25C 3/16* (2006.01)

(52) U.S. Cl.
CPC ............... *C25C 3/16* (2013.01); *B23K 2203/10* (2013.01)
USPC ..................... 228/179.1; 228/178; 228/180.1; 204/194; 204/242

(58) Field of Classification Search
USPC ............ 204/194, 242; 228/178, 179.1, 180.1
See application file for complete search history.

(56) References Cited

FOREIGN PATENT DOCUMENTS

| CN | 1749437 A | 3/2006 |
|----|-----------|--------|
| CN | 101423961 A | 5/2009 |

(Continued)

OTHER PUBLICATIONS

CN1749437A english computer translation.*

(Continued)

*Primary Examiner* — Erin Saad
(74) *Attorney, Agent, or Firm* — Cantor Colburn LLP

(57) ABSTRACT

A device using the live welding method for aluminum electrolytic cell overhauling under series full current consists of short-circuit buses at the bottom of the cell (1), pillar buses (2), an anode bus (3), a balance bus (4), a inter-cell standby bus (5), a door-shaped pillar clamp (6), an arcuate clamp (7) of anode buses, a current conversion switch (8, a mechanical switching device (9) for the short-circuit port, a voltage sensor and wires thereof (10), a temperature sensor and wires thereof (11), a system (12) for data acquiring, displaying, analyzing and alarming, an A-side welding area (13), a B-side welding area (14) and compression-joint points (15) on pillar soft belts of overhauling cells; and the live welding method comprises the following steps: when welding is required to be performed in some zone, the currents of short-circuit buses at the bottom of the cell (1) and pillar buses (2) which influence the welding area most are cut off, the serial currents are shunted to other pillar buses (2), other buses at the bottom of the cell (1) and the inter-cell standby buses (5) such that the magnetic field intensity at the welding area can be lowered to the extent that welding can be performed so as to perform welding, and such a device and method can achieve live welding of aluminum electrolytic cells overhauling under series full current.

3 Claims, 6 Drawing Sheets

(56) References Cited

FOREIGN PATENT DOCUMENTS

| CN | 101249585 A | 8/2009 |
|---|---|---|
| CN | 201296795 Y | 8/2009 |

OTHER PUBLICATIONS

CN201296795Y english computer translation.*

International Preliminary Report on Patentability for International Application No. PCT/CN2010/001841, issued May 22, 2012, with English translation.
International Search Report for International Application No. PCT/CN2010/001841, mailed Feb. 24, 2011, with English translation.
Written Opinion of the International Searching Authority for International Application No. PCT/CN2010/001841, mailed Feb. 24, 2011, with English translation.

* cited by examiner

US 8,833,637 B2

LIVE WELDING METHOD AND ARRANGEMENT FOR ALUMINUM ELECTROLYTIC CELL UNDER SERIES FULL CURRENT

TECHNICAL FIELD

The present invention relates to a live welding method and arrangement for an aluminum electrolytic cell under series full current, which belongs to the technical field of aluminum electrolysis.

BACKGROUND ART

A cathode steel bar and a cathode soft belt (CSB) of an electrolytic cell (EC) can be connected by two manners, i.e., welding and compression-joint.

In early designs, pre-baked anode electrolytic cells are all connected by welding at home and abroad, which welding is usually conducted under series power-off condition. For welding of the electrolytic cells of 200 KA or below, some aluminum plants have attempted to use such manners as "shielding", "draining", or "direct live welding". Whether the welding operation is conducted or not is closely related to welder's experience. In addition, even though the welding can be conducted, the welding quality is poorer. In recent years, the size of the electrolytic cell becomes large increasingly, and the rise of current intensity makes bigger the magnetic field intensity around the electrolytic cell, such that the cathode steel bar and the soft belt of a large-sized cell cannot be connected by welding. As such, the cathode steel bar and the cathode soft belt of the electrolytic cell are mostly connected by compression-joint in recent years so as to facilitate overhauling. The advantages and disadvantages of the prior art welding and compression-joint methods are listed as follows:

|  | Compression-joint | Welding |
| --- | --- | --- |
| Implementing conditions | Not requiring series power-off | Requiring series power-off |
| Convenience | Relatively troublesome in mounting; high requirement on contact surfaces which require pickling, polishing and multiple tightening | Relatively troublesome in mounting; requiring a welding machine upon operation for surfacing several steel plates |
| Maintainability | Possible, but very troublesome | Difficult to maintenance |
| Voltage drop | Higher, and usually controlled under 20 mv | Lower. Usually the control standard is less than 12 mv |
| Through-flow uniformity | Poorer, and greatly influenced by accidental factors | Gooder |

It can be seen from the above analysis that characteristics of welding exceed or are similar to those of compression-joint except for requirement of series power-off upon operation. Therefore, a technique and related arrangement for live welding of electrolytic cells under series full current is needed to developed, not only to avoid series power-off, but also to reduce the voltage drop of a bus system and facilitate electric balance of the electrolytic cell bus, which brings social and economic benefits of energy saving, production increase and emission reduction to aluminum electrolysis enterprises.

SUMMARY OF THE INVENTION

The technical problem intended to be solved by the present invention is to provide a live welding method and arrangement for an aluminum electrolytic cell under series full current so as to overcome the following shortcomings in the prior art: conventional non-live welding is operated under series power-off condition, which results in electric energy loss, production reduction and emission increase of greenhouse gases; direct live welding has poor welding quality, and high voltage drop which may result in electrical energy loss; compression-joint has trouble in installation which may increase work amount, high voltage drop which may result in electrical energy loss, and poor through-flow uniformity which may cause the operation of electrolytic cells unstable.

The present invention is achieved by dividing an electrolytic cell welding area into a plurality of zones at B side (namely, power output side) and a plurality of zones at A side (namely, power input side), using different guiding-current methods upon welding at B side and A side; cutting off the current of short-circuit buses at the bottom of the cell (namely, CBB, Cell Bottom Bus) and pillar buses which influence the welding area most when some zone needs to be welded, guiding the serial currents to other pillar buses, short-circuit buses at the bottom of the cell and a inter-cell standby bus (namely, ICB, Inter-Cell Bus) such that the magnetic field intensity at the welding area can be lowered to the extent that welding can be performed, and then using a welding machine to perform welding.

When the electrolytic cells at B side are welded, a short-circuit port corresponding to the B-side non-welding area is kept closed, the short-circuit buses at the bottom of the cell are still in a through-flowing state, and the inter-cell standby bus is connected. When the overhauling cells in some zone at B side are welded, a short-circuit port corresponding to the zone is cut off, the short-circuit buses at the bottom of the cell are disconnected such that the currents are shunted to other short-circuit buses at the bottom of the cell and inter-cell standby buses, a cell condition monitoring and alarming system is switched on to be in a working state, and then welding operation is performed.

When the overhauling cells at A side are welded, a short-circuit port corresponding to the B-side non-welding area is kept closed, the short-circuit buses at the bottom of the cell are still in a through-flowing state, and the inter-cell standby bus is connected. When the overhauling cells in some zone at B side are welded, a short-circuit port corresponding to the zone is cut off, the short-circuit buses at the bottom of the cell are disconnected and meanwhile compression-joint points of the pillar soft belt corresponding to an A-side welding area are disconnected so as to cut off the pillar buses, such that the currents are shunted to other short-circuit buses at the bottom of the cell and inter-cell standby buses, the cell condition monitoring and alarming system is switched on to be in a working state, and then welding operation is performed.

The arrangement of the present invention comprises: short-circuit buses at the bottom of the cell, pillar buses, an anode bus, a balance bus, a inter-cell standby bus, wherein short-circuit buses at the bottom of the cell, pillar buses, the anode bus, and the balance bus are sequentially connected, and the inter-cell standby bus is connected at one end with the pillar buses of downstream cells by a door-shaped pillar clamp, and connected at the other end with the balance bus by an arcuate clamp of anode buses; the pillar buses are provided with a current conversion switch and compression-joint points on the pillar soft belts of the overhauling cells; a mechanical switching device for the short-circuit port is mounted on the pillar buses; the pillar buses and the inter-cell standby buses are respectively provided with a voltage sensor and a temperature sensor which are connected with a system for data acquiring, displaying, analyzing and alarming via their wires;

and the short-circuit buses at the bottom of the cell are provided at both ends with the A-side welding area and a B-side welding area respectively.

The technical principle of the present invention is as follows:

In regard to the current status that welding cannot be performed due to big magnetic field intensity at the welding parts of the cathode soft belt of the overhauling electrolytic cells, the present invention divides all the welding points of the cathode soft belt of the electrolytic cells into a plurality of zones at A side (namely, power input side) and B side (namely, power output side). When welding is required to be performed in some zone, the currents of short-circuit buses at the bottom of the cell and pillar buses which influence the welding area most are cut off, the serial currents are shunted to other pillar buses, buses at the bottom of the cell and the inter-cell standby buses such that the magnetic field intensity at the welding area can be lowered to the extent that welding can be performed, and then a common welding machine is used to perform welding. During the above operation, the component parts of the arrangement have the following functions:

The inter-cell standby bus comprises the inter-cell standby bus, the door-shaped pillar clamp, and the arcuate clamp of anode buses. It can share a portion of serial currents, lower the density of the currents of buses at the bottom of the cell, reduce the through-flowing pressure of the buses at the bottom of the cell, and improve safety; lower the magnetic field intensity of the welding areas while reducing currents of other buses at the bottom of the cell; and facilitate uniformity of anode currents of the downstream cells while welding the cathode soft belt at A side.

The device for starting up and shutting down cells under series full current comprises a current conversion switch and a mechanical switching device for the short-circuit port, which can cut off or close the short-circuit port in a remote controlled manner, achieve switching of currents in the buses at the bottom of the cell, and guarantee personnel's safety; and it can mechanically control the short-circuit port and the current conversion switch in a remote controlled manner under abnormal circumstances so as to ensure that the abnormal circumstances can be dealt with timely and safely.

The cell condition monitoring and alarming system comprises the voltage sensor, the temperature sensor and the system for data acquiring, displaying, analyzing and alarming via their wires. During the whole process of current switching and welding, it can monitor the guiding-current or through-flowing condition of the overhauling cells and the upstream and downstream cells thereof. If there is anything abnormal, alarm is sent immediately so as to fully guarantee the safety of personnel and devices.

In comparison with the prior art, the present invention has the following advantages:

(1) compared with the conventional non-live welding manner, the present invention can avoid series power-off, reduce the electrical energy loss caused by power-off, avoid production reduction, reduce greenhouse gas emission, and bring social and economic benefits of energy saving, production increase and emission reduction to the enterprises.

(2) compared with direct live welding manner (which is usually performed on the electrolytic cells of 200 KA or below), the present invention can improve the welding quality of the cathode soft belt and lower the operating voltage of the electrolytic cell, thereby reducing electrical energy loss and bringing social and economic benefit of energy saving to the enterprises.

(3) compared with the compression-joint manner commonly used for the large-sized electrolytic cells, the present invention can effectively lower the voltage drop at the connection between the cathode steel bar and the cathode soft belt, and reduce the electrical energy loss at this place caused by heat generation. In addition, it can also increase uniformity of cathode currents and facilitate operational stability of the electrolytic cells so as to bring social and economic benefit of energy saving to the enterprises.

DETAILED DESCRIPTION OF THE PREFERRED EMBODIMENTS

Figure 1:
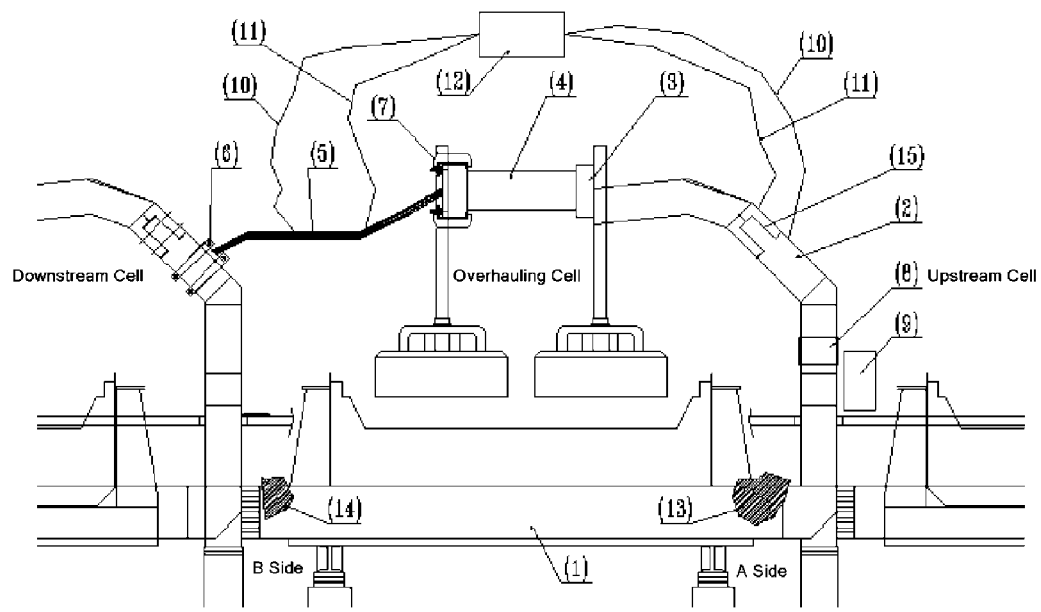
FIG. 1 is the structural view of the configuration of the present invention.

Take a four-point power input electrolytic cell as an example (in the following, all electrolytic cells refer to over-hauled electrolytic cells):

As shown in FIG. 1, the device of the present invention consists of short-circuit buses at the bottom of the cell 1, pillar buses 2, an anode bus 3, a balance bus 4, a inter-cell standby bus 5, wherein short-circuit buses at the bottom of the cell 1, pillar buses 2, the anode bus 3, and the balance bus 4 are sequentially connected, and the inter-cell standby bus 5 is connected at one end with the pillar buses 2 of downstream cells by a door-shaped pillar clamp 6, and connected at the other end with the balance bus 4 by an arcuate clamp of anode buses 7; the pillar buses 2 are provided with a current conversion switch 8 and compression-joint points 15 on pillar soft belts of overhauling cells; a mechanical switching device 9 for the short-circuit port is mounted on the pillar buses; the pillar buses 2 and the inter-cell standby buses 5 are respectively provided with a voltage sensor 10 and a temperature sensor 11 which are connected with a system 12 for data acquiring, displaying, analyzing and alarming via their wires; and the short-circuit buses at the bottom of the cell 1 are provided at both ends with the A-side welding area 1) and the B-side welding area 14 respectively.

Figure 2:
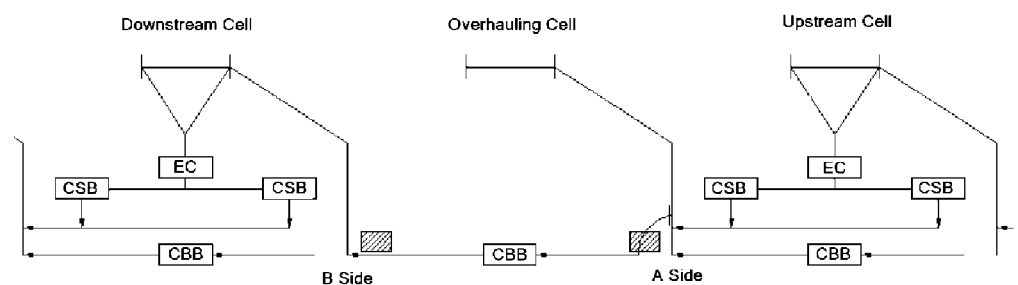
FIG. 2 is a circuit diagram of the present invention.
Figure 3:
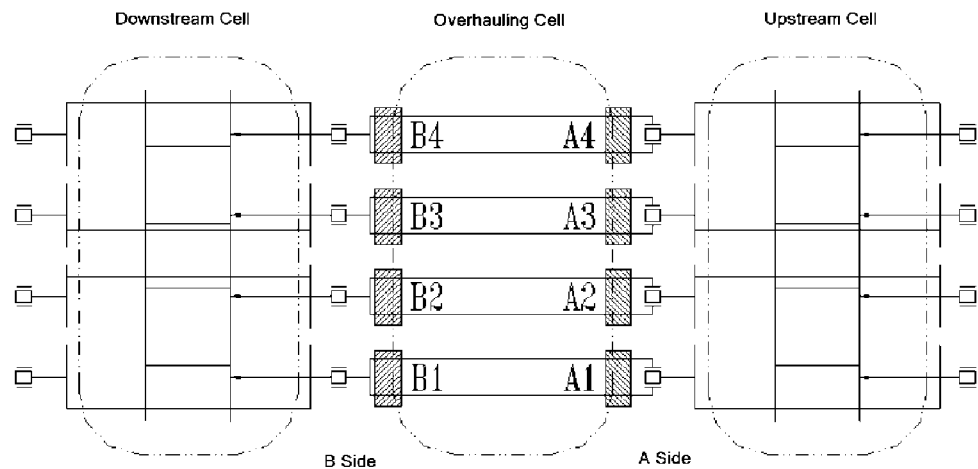
FIG. 3 is a schematic view showing the partition of circuits and welding zones of the present invention.

As shown in FIGS. 2 and 3, the welding areas of the electrolytic cells are firstly divided into B1, B2, B3, B4 at B side and A1, A2, A3, A4 at A side. Different guiding-current methods are used upon welding at B side and A side respectively.

Figure 4:
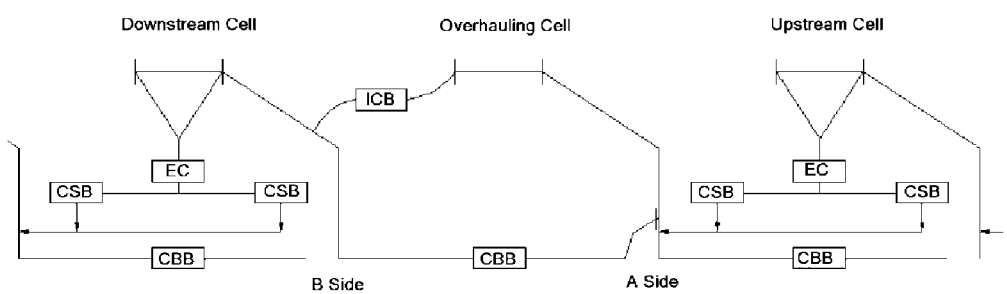
FIG. 4 is a circuit diagram corresponding to a B-side non-welding area.
Figure 5:
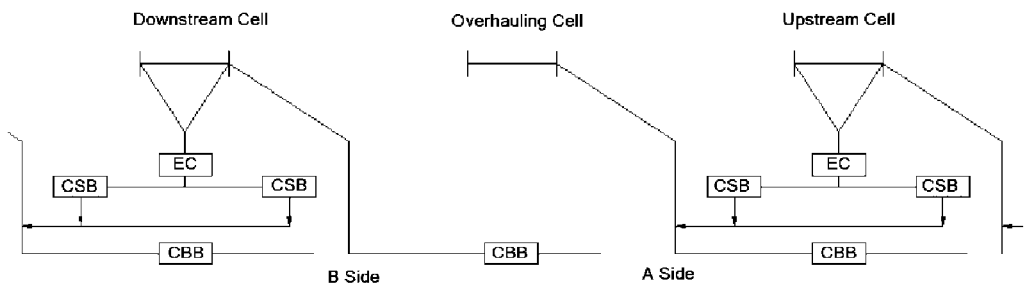
FIG. 5 is a circuit diagram corresponding to a B-side welding area.
Figure 6:
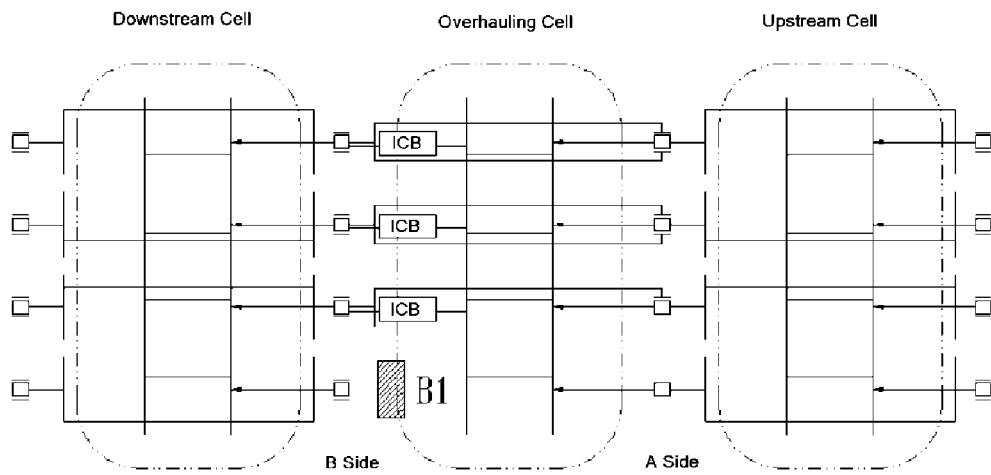
FIG. 6 is a circuit diagram upon welding at B1 zone.
Figure 7:
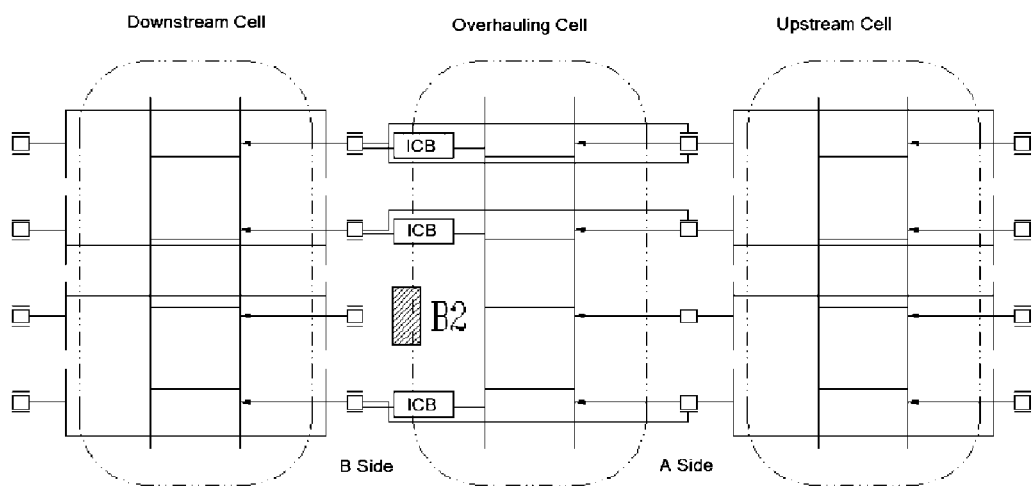
FIG. 7 is a circuit diagram upon welding at B2 zone.
Figure 8:
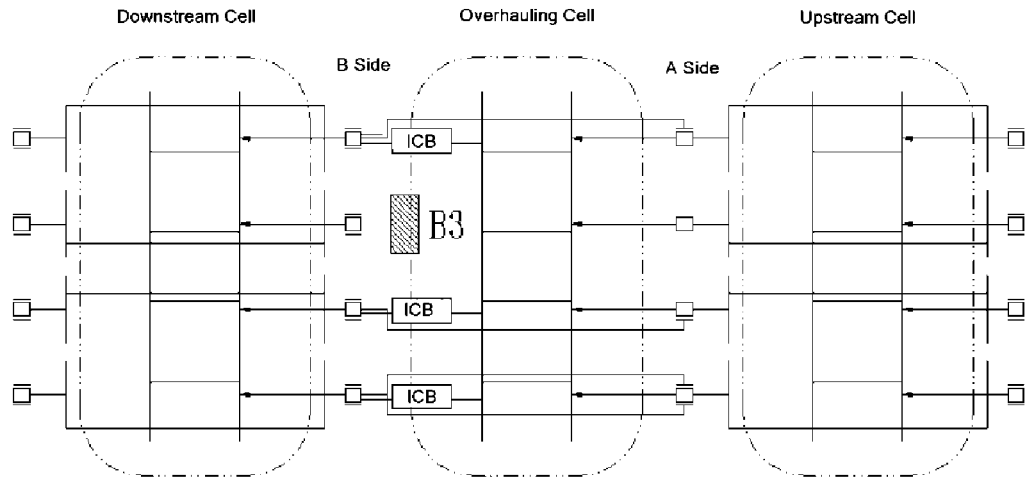
FIG. 8 is a circuit diagram upon welding at B3 zone.
Figure 9:
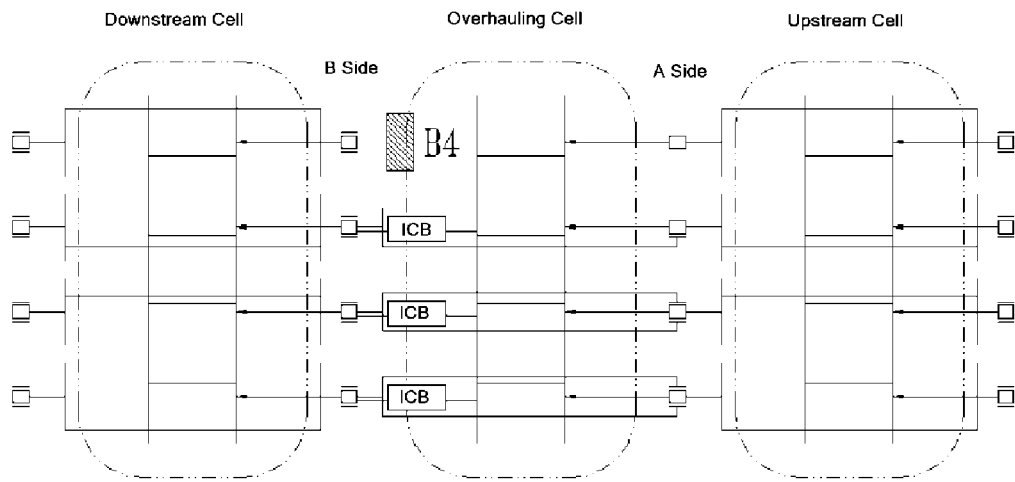
FIG. 9 is a circuit diagram upon welding at B4 zone.

When the electrolytic cells at B side are welded, the first step is to switch the circuits of overhauling cells to the following state: as shown in FIG. 4, a short-circuit port corresponding to the B-side non-welding area is kept closed, the short-circuit buses at the bottom of the cell 1 are still in a through-flowing state, and the inter-cell standby bus 5 is connected. As shown in FIG. 5, a short-circuit port corresponding to the B-side welding zone is cut off, the short-circuit buses at the bottom of the cell 1 are disconnected. As shown in FIGS. 6, 7, 8 and 9, when the overhauling cells in some zone at B side are welded, a short-circuit port corresponding to the zone is cut off, the short-circuit buses at the bottom of the cell 1 are disconnected such that the currents are shunted to other short-circuit buses at the bottom of the cell and inter-cell standby buses. Furthermore, one can decide whether or not to cut off or close the adjacent short-circuit port in proximity to the welding area according to the design and magnetic field conditions. The second step is to switch on a cell condition monitoring and alarming system 12 to make it into a working state. The third step is to perform welding operation.

Figure 10:
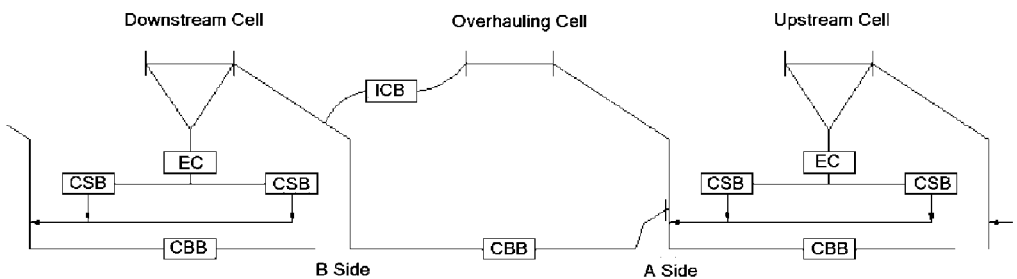
FIG. 10 is a circuit diagram corresponding to an A-side non-welding area.
Figure 11:
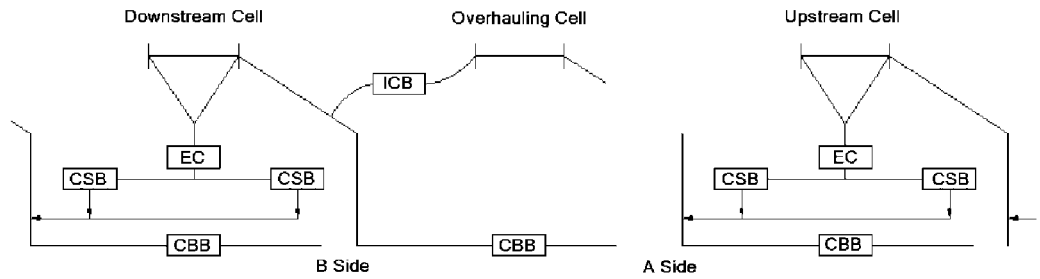
FIG. 11 is a circuit diagram corresponding to an A-side welding area.
Figure 12:
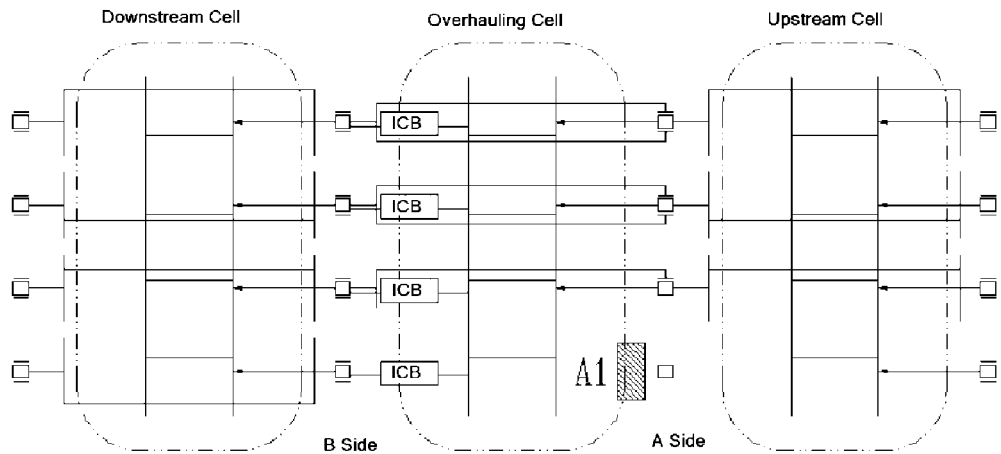
FIG. 12 is a circuit diagram upon welding at A1 zone.
Figure 13:
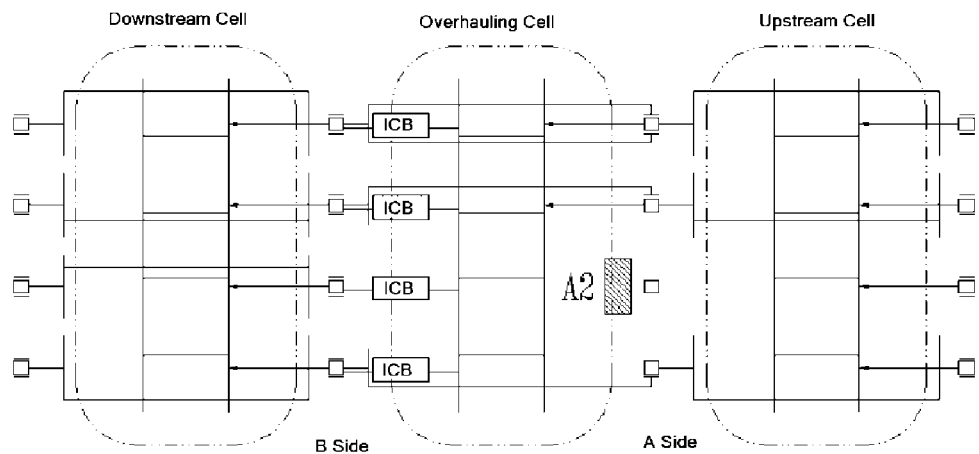
FIG. 13 is a circuit diagram upon welding at A2 zone.
Figure 14:
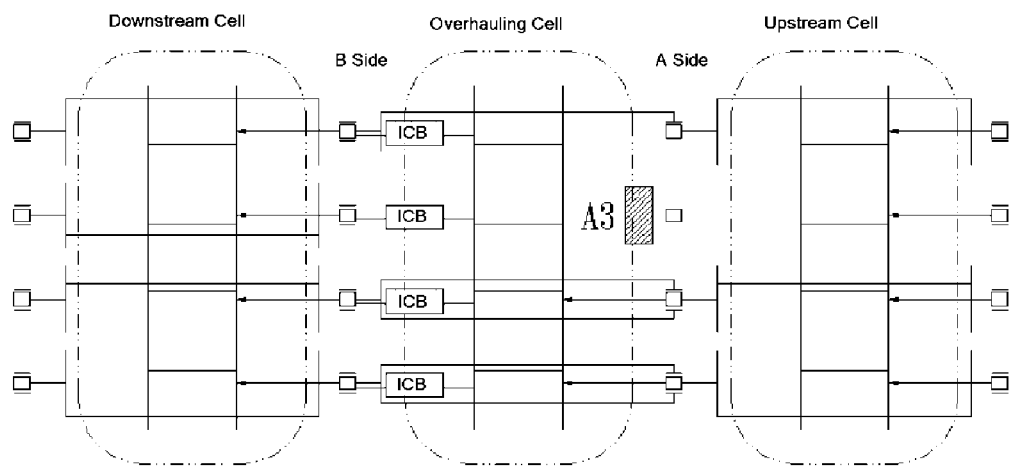
FIG. 14 is a circuit diagram upon welding at A3 zone.
Figure 15:
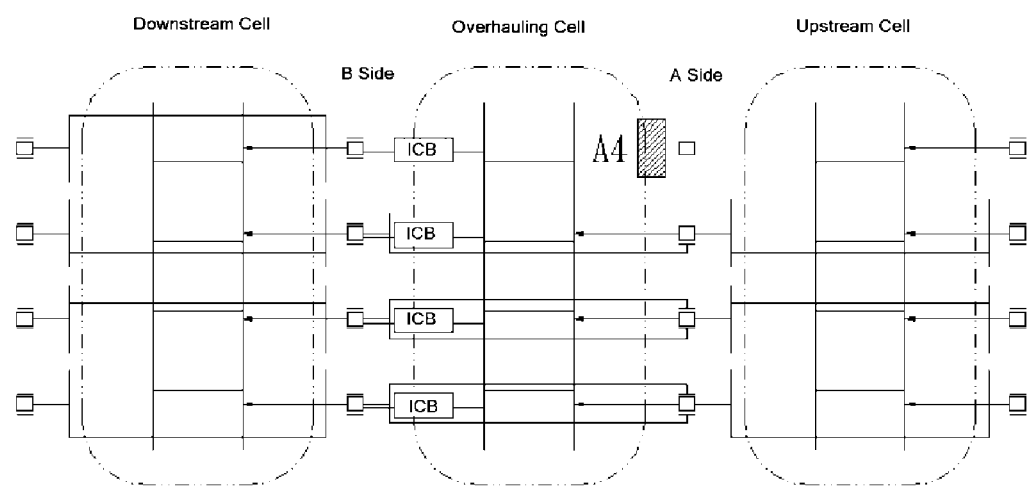
FIG. 15 is a circuit diagram upon welding at A4 zone.

When the overhauling cells at A side are welded, the first step is to switch the circuits of overhauling cells to the following state: as shown in FIG. 10, a short-circuit port corresponding to the B-side non-welding area is kept closed, the short-circuit buses at the bottom of the cell 1 are still in a through-flowing state, and the inter-cell standby bus 5 is connected. As shown in FIG. 11, a short-circuit port corresponding to the B-side welding zone is cut off, the short-circuit buses at the bottom of the cell 1 are disconnected, and meanwhile compression-joint points 15 of the pillar soft belt corresponding to the B-side welding area are disconnected so as to cut off the pillar buses. As shown in FIGS. 12, 13, 14 and 15, when the overhauling cells in some zone at B side are welded, a short-circuit port corresponding to the zone is cut off, the short-circuit buses at the bottom of the cell 1 are disconnected such that the currents are shunted to other short-circuit buses at the bottom of the cell 1 and inter-cell standby buses 5 and meanwhile compression-joint points 15 of the pillar soft belt corresponding to the B-side welding area are disconnected so as to cut off the pillar buses. Furthermore, one can decide whether or not to cut off or close the adjacent short-circuit port in proximity to the welding area according to the design and magnetic field conditions. The second step is to switch on a cell condition monitoring and alarming system 12 to make it into a working state. The third step is to perform welding operation.

The short-circuit port can be cut off or closed manually in the premise that the through-flowing of the short-circuit buses at the bottom of the cell 1, the pillar buses 2, the anode bus 3, and the balance bus 4 and the inter-cell standby buses 5 are normal and the compression-joint places are normal.

The inter-cell standby buses can be spared in the premise that the current density of the short-circuit buses at the bottom of the cell 1, the pillar buses 2, the anode bus 3, and the balance bus 4 is normal and the magnetic field intensity of the place where welding is performed permits.

What is claimed is:

1. A live welding method for aluminum electrolytic cell overhauling under series full current, used for welding cathode soft belt, pillar buses and short-circuit buses at the bottom of the cell, the method comprising:
   dividing an electrolytic cell welding area into a plurality of zones at a power output side, and a plurality of zones at a power input side, using different guiding-current methods upon welding at the power output side and the power input side, serial currents being guided through all of the pillar buses and short-circuit buses at the bottom of the cell and an inter-cell standby bus;
   during the welding of a zone, cutting off currents of short-circuit buses at the bottom of the cell and pillar buses which influence a magnetic field intensity of the zone, guiding the currents of the serial currents passing through said short-circuit buses at the bottom of the cell and pillar buses to the pillar buses, short-circuit buses at the bottom of the cell and an inter-cell standby bus of other zones not to be welded, such that the magnetic field intensity at the zone to be welded is lowered to the extent that welding can be performed, and then using a welding machine to perform welding.

2. The live welding method for aluminum electrolytic cell overhauling under series full current according to claim 1, characterized in that when the electrolytic cell at the power output side are is welded, a short-circuit port corresponding to a power output side non-welding area is kept closed, the currents are still guided through the short-circuit buses at the bottom of the cell, and the inter-cell standby bus is connected; when the overhauling cell in some zone at the power output side is welded, a short-circuit port corresponding to the zone is cut off, the short-circuit buses at the bottom of the cell are disconnected such that the currents are shunted to other short-circuit buses at the bottom of the cell and inter-cell standby buses, a cell condition monitoring and alarming system is switched on to be in a working state, and then welding operation is performed.

3. The live welding method for aluminum electrolytic cell overhauling under series full current according to claim 1, characterized in that when the overhauling cell at the power input side is welded, a short-circuit port corresponding to the power output side non-welding area is kept closed, the currents are still guided through the short-circuit buses at the bottom of the cell, and the inter-cell standby bus is connected; when the overhauling cell in some zone at the power output side is welded, a short-circuit port corresponding to the zone is cut off, the short-circuit buses at the bottom of the cell are disconnected and meanwhile compression-joint points of the pillar soft belt corresponding to an A-side welding area are disconnected so as to cut off the pillar buses, such that the currents are shunted to other short-circuit buses at the bottom of the cell and the inter-cell standby buses, the cell condition monitoring and alarming system is switched on to be in a working state, and then welding operation is performed.

\* \* \* \* \*